July 7, 1959
A. C. SAMPIETRO
2,893,369
FUEL PUMP CONTROL SYSTEM
Filed April 6, 1955
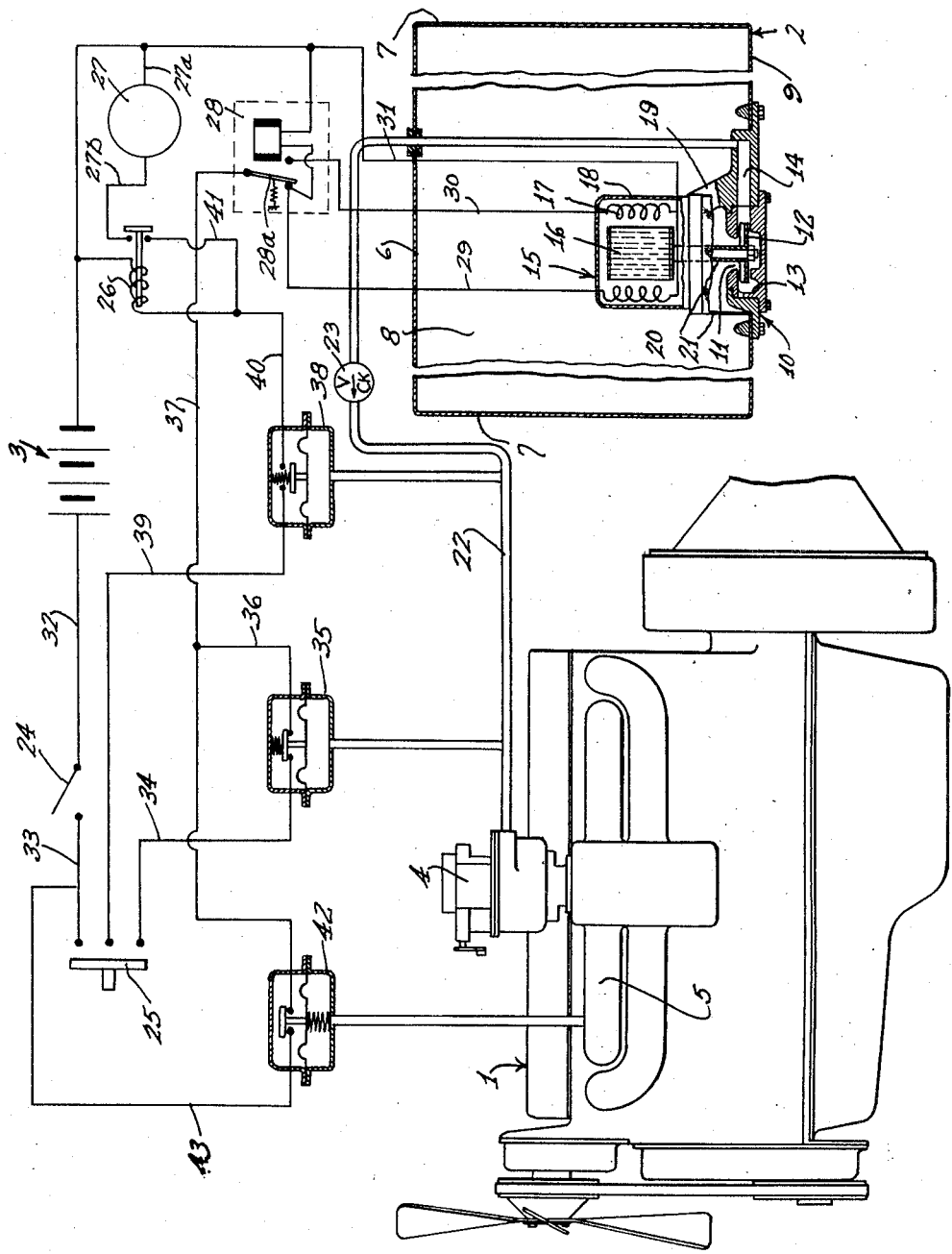
Inventor
ACHILLES C. SAMPIETRO
by Hill, Sherman, Meroni, Gross + Simpson Attys.

United States Patent Office 2,893,369
Patented July 7, 1959

2,893,369

FUEL PUMP CONTROL SYSTEM

Achilles C. Sampietro, Ann Arbor, Mich., assignor to Thompson Ramo Wooldridge Inc., a corporation of Ohio Application April 6, 1955, Serial No. 499,667

12 Claims. (Cl. 123—179)

This invention relates to improvements in a fuel pump arrangement for internal combustion engines or the like, and more particularly to a fuel pump system adapted for use with automotive vehicles, wherein the fuel pump is independently driven and located at a point remote from the engine, althrough other uses may be apparent to one skilled in the art.

The present invention deals with a fuel system for automotive vehicles including a centrifugal fuel pump, an explosion-proof alternating current motor for driving the pump, both of which are submerged in the fuel tank of a vehicle, and an electrical control circuit for the pump including a plurality of pressure responsive switches interlocked with the ignition and starter system of the engine.

Heretofore, the well known automotive engine driven fuel pump has been generally acceptable, but objectionable as to its vapor locking tendencies at elevated underhood temperatures. These vapor locking tendencies have alarmingly increased due to a number of causes such as modern styling, which decrees lower hoods, V-type engines which have more hot manifolds and exhaust pipes than in-line engines, silencing material secured to the underside of the hood such as fiber glass mats which act as insulation and retain heat, and newer types of fuels which contain more volatile materials to conserve petroleum. To handle sufficient solid fuel for the expected vapor handling demand in the ordinary engine driven pump, the unit would have to be several times its present size, which would be prohibitive in cost and in size as to fitting adjacent the engine.

While centrifugal fuel pumps have been heretofore known, they are incapable of "lifting" the fuel out of the tank without the aid of special priming devices. At best, a primed centrifugal pump, in lifting the fuel from the tank, may create a reduced pressure condition that might cause vapor lock. In any event, the cost of a centrifugal fuel pump equipped with a special priming device would be too high to compete with present day fuel pumps.

Accordingly, it is an object of this invention to obviate the above named difficulties and provide a fuel pump for an automotive engine or the like which is driven by an independent prime mover.

Another object of this invention resides in the provision of a fuel system for automotive engines or the like in which vapor locking tendencies are substantially eliminated.

A further object of this invention is to provide a fuel system having a centrifugal fuel pump submerged in the fuel tank which is capable of self-priming.

Still a further object of this invention is to provide a fuel pump and electric motor for driving the fuel pump submerged in the fuel tank, wherein the electric motor is explosion-proof.

Another object of the invention is to provide an electrically controlled fuel system for internal combustion engines or the like having an explosion-proof motor driven centrifugal pump submerged in the fuel tank, a plurality of pressure responsive switches controlling the operation of the fuel pump and the starter motor of the engine, whereby the starter motor will be energized after the proper fuel pressure has been attained in the engine.

Still a further object of this invention resides in the provision of a fuel system having an alternating current motor functioning as a prime mover for the fuel pump for use in automotive engines, wherein means, such as a vibrator, is provided to convert a portion of the direct current supply of the engine to alternating current for driving the motor.

A further object of this invention is to provide an electrically operated fuel pump arrangement for automotive engines or the like, whereby the electrical circuit operating the pump is interlocked with the starter and ignition circuit so that the fuel pump will start and build up the proper fuel pressure before energization of the starter motor.

Still a further object of this invention resides in a fuel system arrangement for automotive engines or the like having a fuel pump submerged in the fuel tank of the engine and an alternating current motor which does not have any commutator or other arcing connections submerged in the fuel tank for driving the fuel pump, whereby the electric motor will be entirely safe even if flooded with fuel.

A further object of the invention is to provide an alternating current motor for driving a fuel pump in an automotive engine, and a vibrator in the energizing circuit from the automobile battery to convert a portion of the direct current from the battery into alternating current for the alternating current motor.

Other objects, features and advantages of the invention will be apparent from the following detailed disclosure, taken in conjunction with the accompanying sheet of drawings, wherein like reference numerals refer to like parts, in which:

The single figure illustrates the present invention in association with an automotive engine, wherein the engine is shown in side elevation, the fuel tank unit is sectional and fragmentary with some parts schematically illustrated, and the electrical operating circuit is shown in substantial diagrammatic form.

As shown on the drawings:

The present invention is shown in association with an automotive engine 1 having a fuel tank 2 and a direct current battery 3. The engine 1 includes a conventional carburetor or other fuel metering device 4 and an intake manifold 5 for supplying the proper mixture of fuel and air to the engine cylinders.

The fuel tank 2 may be of rectangular shape having a top wall 6, side walls 7—7, and end walls 8—8 (only one of which is shown) and a bottom wall 9. A centrifugal fuel pump, generally indicated by the numeral 10, having an inlet 11, an impeller 12, a volute casing 13, and an outlet 14, is suitably secured, such as by nut and bolt assemblies or other equivalent means, in the bottom wall 9 of the fuel tank 2.

The pump is driven by an alternating current motor, generally designated by the numeral 15, preferably an induction type motor having a rotating "squirrel cage" 16, a fixed wound stator 17, and being enclosed by a suitable casing 18. A plurality of legs or standards 19 (only one shown) extend upwardly from the centrifugal pump to support the motor 15 in overlying relationship therewith. A vertical shaft 20 extends vertically downwardly from the squirrel cage 16 to carry at its lower end the impeller 12 of the centrifugal pump 10. A suitable circular screen 21 is positioned between the motor casing 18 and the pump to screen out large particles and prevent them from entering the pump inlet 11.

It is noted that the motor 15 does not have any commutator or other arcing connections, and therefore it will be entirely safe to have the motor flooded with gasoline or other fuel, that is, the motor 15 is explosion-proof. Thus, the motor is explosion-proof by virtue of the fact that there are no electrical contact points that can arc or spark to ignite combustionable vapors. Inasmuch as the centrifugal pump is disposed in the bottom of the fuel tank 2, it will always be submerged in the fuel and therefore be self-priming. It is to be understood that the centrifugal pump will accommodate free flow of fuel therethrough even when it is idle so that no bypass lines are necessary.

The carburetor or other fuel metering device 4 of the engine is connected to the outlet 14 of the pump 10 through a fuel line 22 extending through the top wall 6 of tank 2. A check valve 23 is provided in the fuel line 22 to prevent the return of fluid to the pump 10 and fuel tank 2.

According to the invention, an electrical circuit is provided for the operation of the pump motor 15 which is interlocked with the ignition and starting circuit of the engine 1. The circuit includes an ignition switch 24, a starter button 25, a starter solenoid or relay 26, and a starter motor 27 which is connected in the usual manner to the flywheel of the engine.

A vibrator 28 of the conventional type is provided in the circuit to convert a portion of the direct current from the battery 3 to a pulsating direct current having an alternating current component for driving the pump motor 15. A pair of conductors 29 and 30 lead from the vibrator 28 to connect opposite ends of the winding 17 of the pump motor 15, while a conductor 31 leads from the center of the winding 17 and connects with one side of the battery 3. The opposite side of the battery 3 connects the vibrator through a conductor 32, the ignition switch 24, a conductor 33, the starter switch 25 (when closed), a conductor 34, a conventional normally closed pressure responsive switch 35 in fuel line 22, a conductor 36, and a conductor 37 which connects to a vibrating bar 28a for alternately connecting this side of the battery to opposite ends of the motor winding 17 through conductors 29 and 30. The winding 17 defines a split motor field, so that the current flow to each half of the field is merely switched by the vibrator 28. Hence, each half of the field is energized alternately in opposite directions. In other words, the vibrator alternately switches direct current power to the first half of the field and then to the other, therefore, intermittent or pulsing direct current power is supplied to each half of the field, alternately. This induces an alternating magnetic field which in turn induces alternating current in the rotor of the motor. Hence, after the ignition switch 24 is closed and the starter switch 25 is actuated, the pump motor 15 is immediately energized to feed fuel to the fuel line 22 and the carburetor 4.

When sufficient pressure has been built up in the fuel line 22, the normally open pressure responsive switch 38 in the fuel line closes to energize the starter solenoid 26 and the starter motor 27 for starting the engine. For clarification purposes, the switch 38 is connected to one side of the battery through a conductor 39, starter switch 25, conductor 33, ignition switch 24, and a conductor 32, while the other side of the switch connects to the opposite side of the battery through a conductor 40, through the solenoid of the starter solenoid 26, and through the conductor 31. Upon the closing of the starter solenoid 26, it is seen that the starter motor 27 is connected to one side of the battery through a short conductor 27a and conductor 31, while being connected to the other side of the battery through a short conductor 27b through the starter solenoid 41, the conductor 40, the pressure responsive switch 38, and to the opposite side of the battery as above explained in connection with the switch 38. The pressure responsive switch 38 is, of course, set to close before the pressure responsive switch 35 is set to open.

Immediately upon starting of the engine 1, the starter button 25 is released in the usual manner, thereby de-energizing the starter solenoid 26 and starter 27 and taking out of the circuit the pressure responsive switches 35 and 38 which depend on being connected to one side of the battery through the starter switch 25.

Substantially simultaneously with the starting of the engine 1, if not slightly before, sufficient vacuum is built up in the intake manifold 5 to acuate a normally open vacuum responsive switch 42 which connects to one side of the vibrator 28 through conductor 37 and thereby connects one side of the vibrator to one side of the battery through a starter switch bypass conductor 43, conductor 33, ignition switch 24, and conductor 32. As before, the opposite side of the vibrator 28 and the winding 17 is connected to the opposite side of the battery through conductor 31. Thus, it is seen that the pump 10 and pump motor 15 are maintained in operation during the normal running of the engine 1 through the vacuum built up in the intake manifold 5 of the engine. Of course, when the ignition switch 24 is opened, the pump motor 15 and the pump 10 will cease operation.

While the present invention was illustrated and described as adapted to an automotive engine, it is to be understood that it is primarily useful in automobiles, although other uses and purposes will be obvious to those skilled in the art.

It will be understood that modifications and variations may be effected without departing from the scope of the novel concepts of the present invention, but it is understood that this application is to be limited only by the scope of the appended claims.

I claim as my invention:

1. A fuel system for an internal combustion engine or the like having a carburetor, a fuel tank, a fuel line connecting the carburetor to said tank, an electric starter, a starter solenoid, and a direct current supply which comprises, a centrifugal pump disposed in the bottom of the fuel tank for pumping fuel through said line to the carburetor, an alternating current motor in the bottom of said fuel tank for driving said pump, a vibrator for converting a portion of the direct current to pulsating current for driving said motor, a normally closed pressure responsive switch in said fuel line, a normally open pressure responsive switch in said fuel line, a normally open vacuum responsive switch in the intake manifold of said engine, and an electrical circuit interconnecting the direct current supply source with the starter solenoid, the electric starter, the ignition switch, the starter switch, the vibrator, the pressure responsive switches, and the vacuum responsive switch, whereby upon closing of the ignition switch and starter switch the pump motor is energized through the normally closed pressure responsive switch and the vibrator until pressure is built up in the fuel line to close the normally open pressure responsive switch to energize the starter solenoid and starter, and whereupon the engine is started and the starter switch is opened, vacuum pressure in the manifold will close the normally open vacuum responsive switch to maintain the pump in operation.

2. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to a varying current, said motor operating from the varying current supply, and circuit means interconnected with said ignition and starter system of said engine for controlling the operation of said pump, said circuit means including a switch responsive to the fuel pressure in said fuel line.

3. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to a varying current, said motor operating from the varying current supply and circuit means interconnected with said ignition and starter system of said engine for controlling the operation of said pump said circuit means including a plurality of pressure responsive switches, at least one of said switches being responsive to the fuel pressure in said fuel line.

4. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to pulsating current, said motor operating from the pulsating current supply, and circuit means interconnected with said ignition and starter system of said engine for controlling the operation of said pump, said circuit means including a plurality of pressure responsive switches in said fuel line and a vacuum responsive switch in the intake manifold of said engine.

5. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to pulsating current, said motor operating from the pulsating current supply and circuit means interconnected with said ignition and starter system of said engine for controlling the operation of said pump said circuit means including a normally open and a normally closed pressure responsive switch in said fuel line, and a normally open vacuum responsive switch in the intake manifold of said engine.

6. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to pulsating current, said motor operating from the pulsating current supply and circuit means interconnected with said ignition and starter system of said engine for controlling the operation of said pump, said circuit means including a normally closed pressure responsive switch for energizing the pump motor upon the closing of the ignition and starter circuit, a normally open responsive switch which closes upon a predetermined pressure build-up in the fuel line to energize the starter motor of said engine, and a normally open vacuum responsive switch in the intake manifold of said engine which closes upon a predetermined build-up of vacuum in the manifold to maintain the fuel pump energized, and said normally closed pressure responsive switch opening substantially at the time said vacuum switch closes or at the time the starter circuit is de-energized.

7. In a self-propelled vehicle having an internal combustion engine, a fuel tank, an ignition and starter circuit, and a direct current supply, an apparatus for delivering fuel from the fuel tank to the engine which comprises, a fuel line connecting the tank and engine, a pump in said tank, an explosion-proof electric motor in said tank for driving said pump, means for converting a portion of the direct current supply to pulsating current, said motor operating from the pulsating current supply and circuit means interconnected with said ignition and starter system of said engine for controlling the operation of said pump, said circuit means including a normally closed pressure responsive switch for energizing the pump motor upon the closing of the ignition and starter circuit, a normally open pressure responsive switch which closes upon a predetermined pressure build-up in the fuel line to energize the starter motor of said engine, and a normally open vacuum responsive switch in the intake manifold of said engine which closes upon a predetermined build-up of vacuum in the manifold to maintain the fuel pump energized, and said normally closed pressure responsive switch opening substantially at the time said vacuum switch closes or at the time the starter circuit is de-energized and means in said fuel line to prevent return flow of fuel to said tank.

8. An electrical circuit for a fuel pump system of an internal combustion engine or the like including an explosion-proof motor for driving a pump, said motor not having a commutator or other arcing connections, a vibrator for supplying a pulsating current to said motor, a plurality of pressure responsive switches at least one of which is responsive to the fuel pressure created by the operation of said pump, and said circuit being interconnected with the ignition and starter circuit of said engine.

9. An electrically operated fuel pump system for internal combustion engines having a starter circuit, an ignition circuit, a fuel tank, and a fuel line running from the tank to the engine which comprises a centrifugal pump in the bottom of said tank, an explosion-proof alternating current motor in said tank driving said pump, a vibrator for supplying a variable current to said motor, a normally closed pressure responsive switch in said fuel line for energizing said motor upon the closing of the ignition and starter circuits, a normally open pressure responsive switch in said fuel line upstream from said first switch for energizing the starter motor, and a vacuum responsive switch in the intake manifold of said engine for maintaining the fuel pump in operation upon the opening of the starter circuit or the opening of said normally closed pressure responsive switch.

10. In a fuel system for internal combustion engines or the like, a fuel line connected to supply fuel to said engine, a fuel pump connected to supply fuel under pressure to said line, a first electrical motor for driving said pump, a second electrical motor for starting said engine, a source of electrical energy, a manually operated switch, first circuit means for connecting said first electrical motor to said source of electrical energy to operate said pump, and second circuit means including a normally open fuel line pressure operated switch for connecting said second electrical motor to said source of electrical energy through said manually operated switch when said switch is closed to start said engine only after said pump has been operated to develop a predetermined fuel pressure in said fuel line.

11. In a fuel system for internal combustion engines or the like, a fuel line connected to supply fuel to said engine, a fuel pump connected to supply fuel under pressure to said line, a first electrical motor for driving said pump, a second electrical motor for starting said engine, a source of electrical energy, first circuit means including a normally open manually operated switch and a normally closed fuel line pressure-operated switch for connecting said first electrical motor to said source of electrical energy to operate said pump, second circuit means including said manually-operated switch and a normally open fuel line pressure-operated switch for connecting said second electrical motor to said source of electrical energy to start said engine only after said pump has been operated to develop a predetermined fuel pressure in said fuel line, and third circuit means by-passing said manually operated switch and including a normally open engine-operated switch for connecting said first electrical motor to said source of electrical energy for driving said pump while said manually operated switch is open after said engine has been started.

12. In a fuel system for internal combustion engines or the like, a fuel line connected to supply fuel to said engine, a fuel pump connected to supply fuel under pressure to said line, a first electrical motor for starting said engine, a second electrical motor for driving said pump, a source of electrical energy, first circuit means including a manually operated switch for connecting said first electrical motor to said source of energy to start said engine, second circuit means including said manually operated switch and a series connected normally closed fuel line pressure operated switch for connecting said second electrical motor to said source of electrical energy to drive said pump, and third circuit means by-passing said manually operated switch and including a normally open engine operated switch for connecting said second electrical motor to said source of electrical energy to drive said pump while said engine is operating.

References Cited in the file of this patent

UNITED STATES PATENTS

| | | |
|---|---|---|
| 2,114,249 | Horton | Apr. 12, 1938 |
| 2,218,847 | Korte et al. | Oct. 22, 1940 |
| 2,255,424 | Jandasek | Sept. 9, 1941 |
| 2,395,657 | Dinsmore et al. | Feb. 26, 1946 |
| 2,472,566 | Brown et al. | June 7, 1949 |
| 2,518,712 | Ovens | Aug. 15, 1950 |
| 2,527,092 | Orvedahl | Oct. 24, 1950 |
| 2,580,820 | Nardone | Jan. 1, 1952 |
| 2,592,945 | Odell | Apr. 15, 1952 |
| 2,681,694 | Loft | June 22, 1954 |